United States Patent
Ooki et al.

(10) Patent No.: US 10,901,723 B2
(45) Date of Patent: Jan. 26, 2021

(54) MANAGEMENT SYSTEM FOR FUSION SPLICING DEVICE AND MANAGEMENT METHOD FOR FUSION SPLICING DEVICE

(71) Applicant: SEI Optifrontier Co., Ltd., Yokohama (JP)

(72) Inventors: Kazuyoshi Ooki, Yokohama (JP); Makoto Miyamori, Yokohama (JP)

(73) Assignee: SEI Optifrontier Co., Ltd., Yokohama (JP)

( * ) Notice: Subject to any disclaimer, the term of this patent is extended or adjusted under 35 U.S.C. 154(b) by 0 days.

(21) Appl. No.: 16/340,171

(22) PCT Filed: Oct. 16, 2017

(86) PCT No.: PCT/JP2017/037392
§ 371 (c)(1),
(2) Date: Apr. 8, 2019

(87) PCT Pub. No.: WO2018/074422
PCT Pub. Date: Apr. 26, 2018

(65) Prior Publication Data
US 2019/0310838 A1     Oct. 10, 2019

(30) Foreign Application Priority Data
Oct. 17, 2016 (JP) ................ 2016-203800

(51) Int. Cl.
G06F 8/65 (2018.01)
G02B 6/255 (2006.01)
(Continued)

(52) U.S. Cl.
CPC ............. *G06F 8/65* (2013.01); *G02B 6/255* (2013.01); *G06F 11/00* (2013.01); *H04W 84/12* (2013.01)

(58) Field of Classification Search
CPC ........... G06F 11/00; G06F 8/65; G02B 6/255; H04W 84/12
(Continued)

(56) References Cited

U.S. PATENT DOCUMENTS 6,206,583 B1 * 3/2001 Hishikawa ........... G02B 6/2551
385/96
8,645,943 B2   2/2014 Kanai
(Continued)

FOREIGN PATENT DOCUMENTS

JP        2003-287643 A       10/2003
JP        2004-164115 A        6/2004
(Continued)

OTHER PUBLICATIONS

The Extended European Search Report dated Jun. 9, 2020 in European Patent Application No. 17862510.9.

*Primary Examiner* — John Q Chavis
(74) *Attorney, Agent, or Firm* — Faegre Drinker Biddle & Reath LLP

(57) ABSTRACT

A management system for managing updating of operating software of a plurality of fusion splicers to which unique identifiers are assigned respectively, is disclosed. The management system is provided with a receiving unit that receives identifiers from a plurality of fusion splicers through wireless signals, the identifiers being assigned to the respective fusion splicers, a determination unit that determines whether or not operating software of a fusion splicer assigned to an identifier received by the receiving unit is operating software to be updated, an acquisition unit that acquires operating software update information appropriate for the fusion splicer for which the operating software is determined by the determination unit to be operating software to be updated, and a transmitting unit that transmits the
(Continued)

operating software update information appropriate for the individual fusion splicer acquired by the acquisition unit to the fusion splicer.

16 Claims, 10 Drawing Sheets

(51) Int. Cl.
 *G06F 11/00* (2006.01)
 *H04W 84/12* (2009.01)
(58) Field of Classification Search
 USPC .......................................................... 717/172
 See application file for complete search history.

(56) References Cited

U.S. PATENT DOCUMENTS

| | | | | |
|---|---|---|---|---|
| 2005/0238298 | A1* | 10/2005 | Roark | G02B 6/2551 |
| | | | | 385/96 |
| 2006/0133745 | A1* | 6/2006 | Takayanagi | G02B 6/2551 |
| | | | | 385/97 |
| 2009/0300595 | A1 | 12/2009 | Moran et al. | |
| 2013/0152065 | A1 | 6/2013 | Nishikawa | |
| 2015/0205045 | A1* | 7/2015 | Park | G02B 6/2553 |
| | | | | 65/485 |

FOREIGN PATENT DOCUMENTS

| | | |
|---|---|---|
| JP | 2006-189974 A | 7/2006 |
| JP | 2006-309516 A | 11/2006 |
| JP | 2012-141357 A | 7/2012 |
| JP | 2016-103703 A | 6/2016 |

\* cited by examiner

Fig. 7

| SSID | SERIAL NUMBER | DEVICE TYPE | LATEST VERSION OF OPERATING SOFTWARE | FW UPDATABILITY | DEVICE SETTING NUMBER | CONNECTABLE REGION GROUP NUMBER |
|---|---|---|---|---|---|---|
| T71C_420000001 | 420000001 | T71C | 2.10 | VALID | 1 | 1 |
| T71C_420000002 | 420000002 | T71C | 1.50 | INVALID | 2 | 2 |
| ... | ... | ... | ... | ... | ... | ... |

Fig.8

| DEVICE SETTING NUMBER | FIBER CONNECTING CONDITION 1 | ... | FIBER CONNECTING CONDITION 2 | REINFORCEMENT CONDITION 1 | ... | REINFORCEMENT CONDITION N |
|---|---|---|---|---|---|---|
| 1 | VALID | ... | INVALID | INVALID | ... | VALID |
| 2 | INVALID | ... | VALID | VALID | ... | INVALID |
| ... | ... | ... | ... | ... | ... | ... |

*Fig.9*

| CONNECTABLE REGION GROUP NUMBER | JAPAN | U.S.A. | CHINA | ... | U.K. |
|---|---|---|---|---|---|
| 1 | AVAILABLE | UNAVAILABLE | UNAVAILABLE | ... | AVAILABLE |
| 2 | UNAVAILABLE | UNAVAILABLE | AVAILABLE | ... | UNAVAILABLE |
| ... | ... | ... | ... | ... | ... |

MANAGEMENT SYSTEM FOR FUSION SPLICING DEVICE AND MANAGEMENT METHOD FOR FUSION SPLICING DEVICE

TECHNICAL FIELD

The present invention relates to a management system for a fusion splicer and a management method for a fusion splicer. The present application claims priority based on Japanese Patent Application No. 2016-203800, filed on Oct. 17, 2016, the disclosure of which is incorporated herein by reference in its entirety.

BACKGROUND ART

Patent Literature 1 discloses a fusion splicer for connecting optical fibers with each other. The fusion splicer is configured to perform a predetermined fusion splicing operation according to operating software and updates the operating software as required.

CITATION LIST

Patent Literature

Patent Literature 1: Japanese Unexamined Patent Publication No. JP2012-141357A

SUMMARY OF INVENTION

A management system for fusion splicers according to the present disclosure is a management system for managing update of operating software of a plurality of fusion splicers to which unique identifiers are assigned respectively. The management system comprises a receiving unit that receives identifiers from the respective fusion splicers through wireless signals, the identifiers being assigned to the fusion splicers respectively, a determination unit that determines whether or not operating software of each fusion splicer assigned to each identifier received by the receiving unit is operating software to be updated, an acquisition unit that acquires operating software update information appropriate for a fusion splicer for which the operating software is determined by the determination unit to be operating software to be updated, and a transmitting unit that transmits operating software update information appropriate for the particular fusion splicer acquired by the acquisition unit to the particular fusion splicer.

A management method for fusion splicers according to the present disclosure is a method for managing update of operating software of a plurality of fusion splicers to which unique identifiers are assigned respectively, with a management system. The management method comprises receiving by a receiving unit of the management system, identifiers from the respective fusion splicers through wireless signals, the identifiers being assigned to the fusion splicers respectively, determining by a determination unit of the management system, whether or not operating software of each fusion splicer assigned to each identifier received in the receiving is operating software to be updated, acquiring by an acquisition unit of the management system, operating software update information appropriate for a fusion splicer for which the operating software is determined in the determining to be operating software to be updated, and transmitting by a transmitting unit of the management system, operating software update information appropriate for the particular fusion splicer acquired in the acquiring to the particular fusion splicer.

BRIEF DESCRIPTION OF DRAWINGS

FIG. 7 is a diagram illustrating a database example including SSID of each fusion splicer, latest version information of operating software corresponding to each SSID, and information on updatability of firmware or the like.

FIG. 8 is a diagram illustrating an example of an auxiliary database including fiber connection conditions and reinforcement conditions in accordance with each device setting number included in the database shown in FIG. 7.

FIG. 9 is a diagram illustrating an example of an auxiliary database including information on enablement in each country in accordance with each connectable regional group number included in the database shown in FIG. 7.

DESCRIPTION OF EMBODIMENTS

Figure 1:
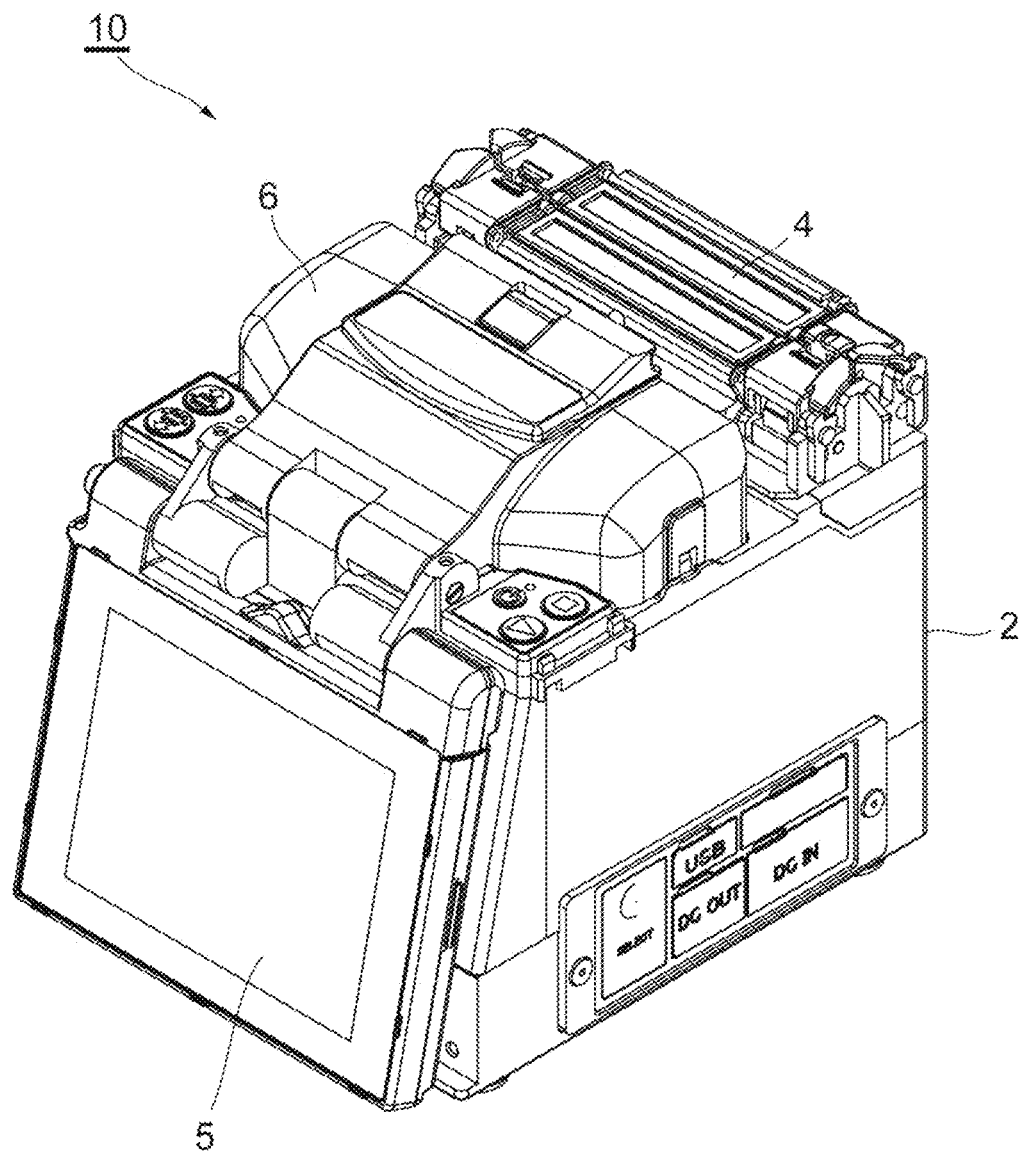
FIG. 1 is a perspective view illustrating a fusion splicer.

Problem to be Solved by Present Disclosure

When connecting a fusion splicer with a management device for updating operating software of the fusion splicer using a cable such as USB and performing update processing of software of each fusion splicer, it is necessary to manually connect the cable every time the update processing of each fusion splicer is performed. Furthermore, one administrator may use and manage many fusion splicers, and in such a case, the software of the many fusion splicers has to be updated collectively, which requires quite a troublesome operation such as sequentially connecting the respective fusion splicers using cables. Moreover, using the above-described method, it is difficult to determine in advance whether or not a fusion splicer is one for which operating software needs to be updated, and such a determination needs to be confirmed with cables actually connected thereto.

Moreover, an environment in which each fusion splicer is used varies finely depending on a region (high temperature region, low temperature region, high humidity region, low atmospheric pressure region, at sea, or the like) and use (for indoor communication network, for outdoor communication network, for trunk line communication network, for optical fiber connection in optical communication equipment, or the like), and therefore it is necessary to select operating software update information appropriate for the environment in which each fusion splicer is used and transmit the update information to each fusion splicer. Thus, the operating software update processing for each fusion splicer results in quite a troublesome operation.

Advantageous Effects of Present Disclosure

According to the management system for a fusion splicer and the management method for a fusion splicer according to the present disclosure, it is possible to easily update operating software of a plurality of fusion splicers.

Description of Embodiments of Present Invention

First, embodiments of the present invention will be enumerated and described. A management system for fusion splicers according to one aspect of the present invention is a management system for managing update of operating software of a plurality of fusion splicers to which unique identifiers are assigned respectively. The management system comprises a receiving unit that receives identifiers from the respective fusion splicers through wireless signals, the identifiers being assigned to the fusion splicers respectively, a determination unit that determines whether or not operating software of each fusion splicer assigned to each identifier received by the receiving unit is operating software to be updated, an acquisition unit that acquires operating software update information appropriate for a fusion splicer for which the operating software is determined by the determination unit to be operating software to be updated, and a transmitting unit that transmits operating software update information appropriate for the particular fusion splicer acquired by the acquisition unit to the particular fusion splicer.

A management method for fusion splicers according to one aspect of the present invention is a management method for managing update of operating software of a plurality of fusion splicers to which unique identifiers are assigned respectively with the management system. The management method comprises receiving by a receiving unit of the management system, identifiers from the respective fusion splicers through wireless signals, the identifiers being assigned to the fusion splicers respectively, determining by a determination unit of the management system, whether or not operating software of each fusion splicer assigned to each identifier received in the receiving is operating software to be updated, acquiring by an acquisition unit of the management system, operating software update information appropriate for a fusion splicer for which the operating software is determined in the determining to be operating software to be updated, and transmitting by a transmitting unit of the management system, operating software update information appropriate for the particular fusion splicer acquired in the acquiring to the particular fusion splicer.

The management system and the management method for fusion splicers determine, when updating operating software, whether or not operating software of each fusion splicer is operating software to be updated based on identifiers uniquely assigned to the plurality of fusion splicers. The management system and the management method acquire update information of operating software appropriate for a fusion splicer, operating software of which is determined to be updated, and transmits the update information to the fusion splicer using a wireless signal. Therefore, according to the management system and the management method, it is not necessary to manually connect the many fusion splicers via cables and it is possible to automatically select update information appropriate for the environment in which the fusion splicer is used and thereby easily update the operating software.

In the management system and the management method for a fusion splicer according to another aspect of the present invention, the receiving unit may acquire individual information of at least any one of version information of operating software of the fusion splicer and body information of the fusion splicer from the fusion splicer which is determined to be a target for update, using a wireless signal. The acquisition unit may collate the individual information acquired by the receiving unit with a predetermined database, and acquire operating software update information appropriate for the fusion splicer. In this case, since update information appropriate for individual information of at least one of the version information of the operating software and body information is acquired, it is possible to update operating software using update information more suitable for the fusion splicers respectively.

In the management system and the management method for a fusion splicer according to a further aspect of the present invention, the above-described predetermined database may also be information in which an identifier of each fusion splicer is associated with at least one of current version information of operating software of each fusion splicer and body information of each fusion splicer. In this case, suitable update information can be selected based on the information associated with the identifier, and operating software can be updated using more suitable update information for each fusion splicer.

In the management system and the management method for a fusion splicer according to a still further aspect of the present invention, when the determination unit determines that operating software of at least two fusion splicers is operating software to be updated, respective processes of acquisition of update information by the acquisition unit and transmission of update information by the transmitting unit may be sequentially repeated for each fusion splicer. In this case, for all of the plurality of fusion splicers within a wirelessly communicable range, operating software can be updated sequentially using suitable update information for the respective fusion splicers.

In the management system and the management method for a fusion splicer according to a still further aspect of the present invention, the update information of operating software appropriate for each fusion splicer may include information individually set according to at least one condition of region-related information and a purpose for which the fusion splicer is used. The region-related information includes at least one of time, temperature, humidity, atmospheric pressure and position (e.g., longitude, latitude, name of country, IP address or the like) of a region in which the fusion splicer is used. In this case, operating software can be updated using update information more suitable for the environment in which the fusion splicers are used.

In the management system and the management method for a fusion splicer according to a still further aspect of the present invention, the receiving unit may also include a function as a wireless LAN adapter wirelessly communicable with a plurality of fusion splicers having functions as wireless access points via a wireless LAN. In this case, since the fusion splicer is used as a wireless access point, the aforementioned operations/effects can be easily exerted without the need for newly constructing a network environment.

Details of Embodiments of Present Invention

A management system and a management method for fusion splicers according to an embodiment of the present invention will be described with reference to the accompanying drawings. The present invention is not limited to these illustrations, but equivalents in meaning of the scope of claims and all modifications within the scope of claims indicated by the scope of claims are intended to be included.

Figure 2:
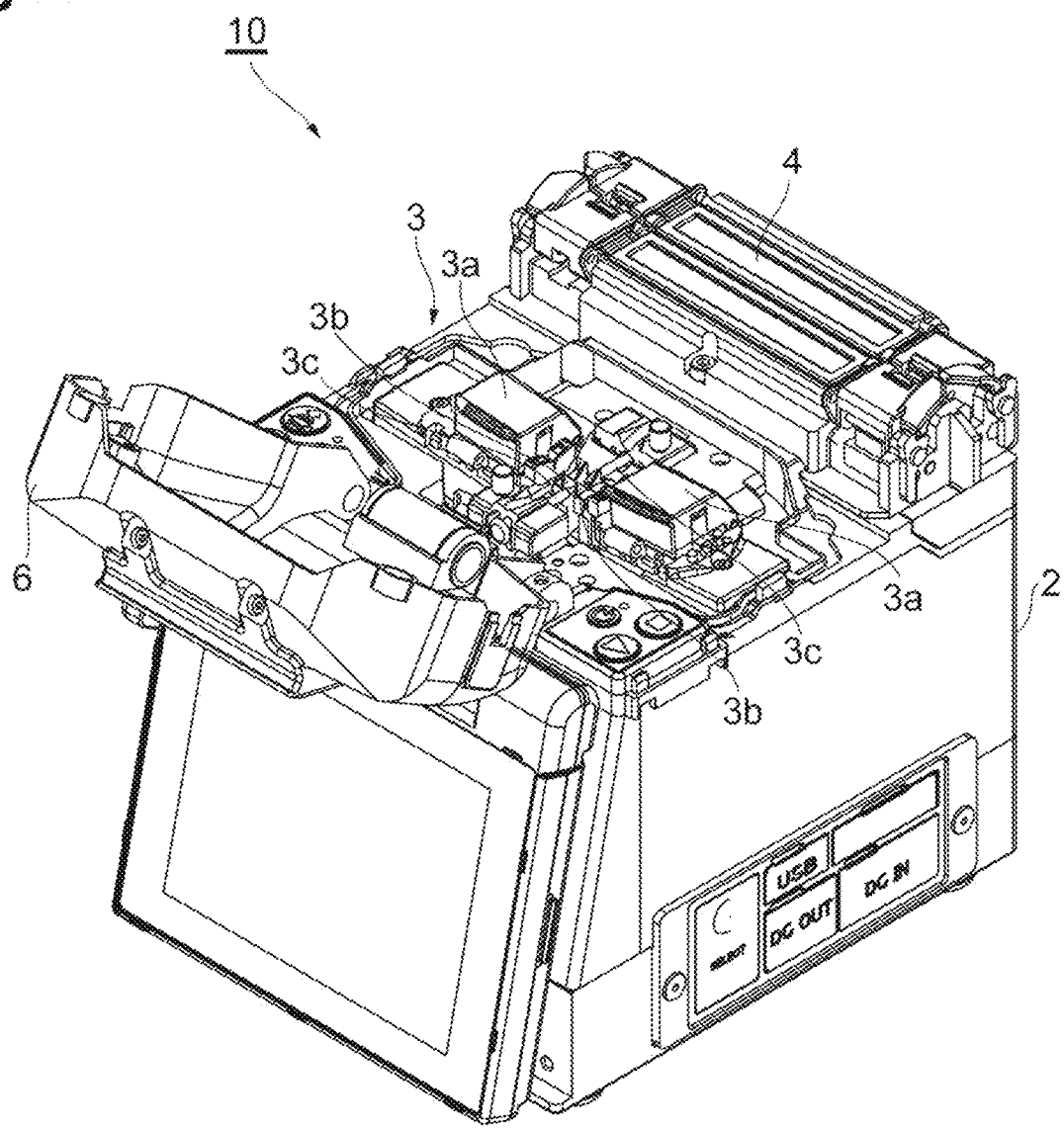
FIG. 2 is a perspective view illustrating a fusion splicing unit (inner structure) of the optical fiber in the fusion splicer shown in FIG. 1.

First, a fusion splicer 10 for which operating software is updated by the management system according to the present embodiment will be described with reference to FIG. 1 and FIG. 2. FIG. 1 and FIG. 2 are perspective views illustrating an appearance of the fusion splicer; FIG. 1 showing an appearance when a windshield cover is closed and FIG. 2 showing an appearance when a windshield cover is open and an inner structure of the fusion splicer is visible. The fusion splicer 10 is a device for fusion splicing between optical fibers, and is provided with a box-shaped housing 2 as shown in FIG. 1 and FIG. 2. A fusion unit 3 for fusing between the optical fibers and a heater 4 for causing a fiber reinforcement sleeve covering the fusion splicing portion of the optical fibers fused by the fusion unit 3 are provided at the top of the housing 2. The fusion splicer 10 is provided with a monitor 5 for displaying a situation of fusion splicing between the optical fibers, images of which are picked up by a camera (not shown) disposed inside the housing 2. The fusion splicer 10 is further provided with a windshield cover 6 for preventing wind from entering the fusion unit 3.

The fusion unit 3 includes a pair of fiber positioning units 3b, a pair of discharge electrodes 3c, and a holder placement unit capable of placing a pair of optical fiber holders 3a. Optical fibers to be fused are held and fixed to the optical fiber holders 3a respectively and the optical fiber holders are placed on and fixed to the holder placement unit respectively. The fiber positioning units 3b are placed between the optical fiber holders 3a to position distal end portions of the optical fibers respectively held to the optical fiber holders 3a. The discharge electrodes 3c are electrodes disposed between the fiber positioning units 3b to fuse distal ends of the optical fibers through arc discharge. In the fusion splicer 10, various conditions of positioning of fibers by the fiber positioning units 3b and arc discharge by the discharge electrodes 3c are controlled by operating software stored in a memory or the like of the fusion splicer 10.

Figure 3:
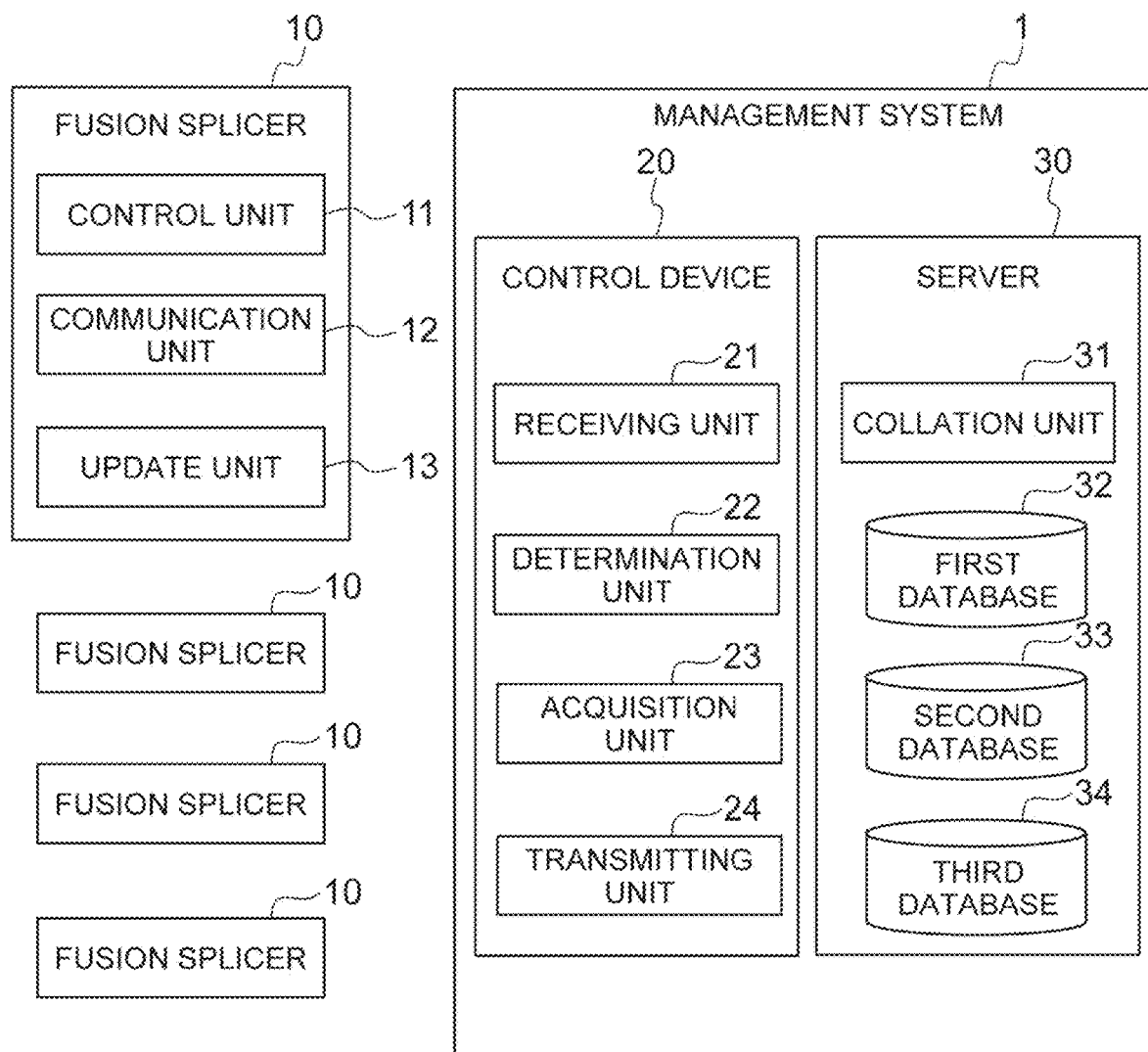
FIG. 3 is a block diagram illustrating an overview of a management system of the fusion splicer according to an aspect of the present invention.

Next, a configuration of the management system 1 for update processing of versions or the like of the operating software of the fusion splicer 10 will be described with reference to FIG. 3. FIG. 3 is a block diagram illustrating an overview of the management system for fusion splicers according to an aspect of the present invention. As shown in FIG. 3, the management system 1 is constructed of a control device 20 and a server 30. The control device 20 is configured to be able to carry out wireless communication in a 2.4 GHz band conforming to IEEE802.11, which will be described later, with each fusion splicer 10. The control device 20 is connected to the server 30 via an electric communication channel (can also partially include a wireless channel) and configured to be able to transmit/receive various kinds of information.

Figure 4:
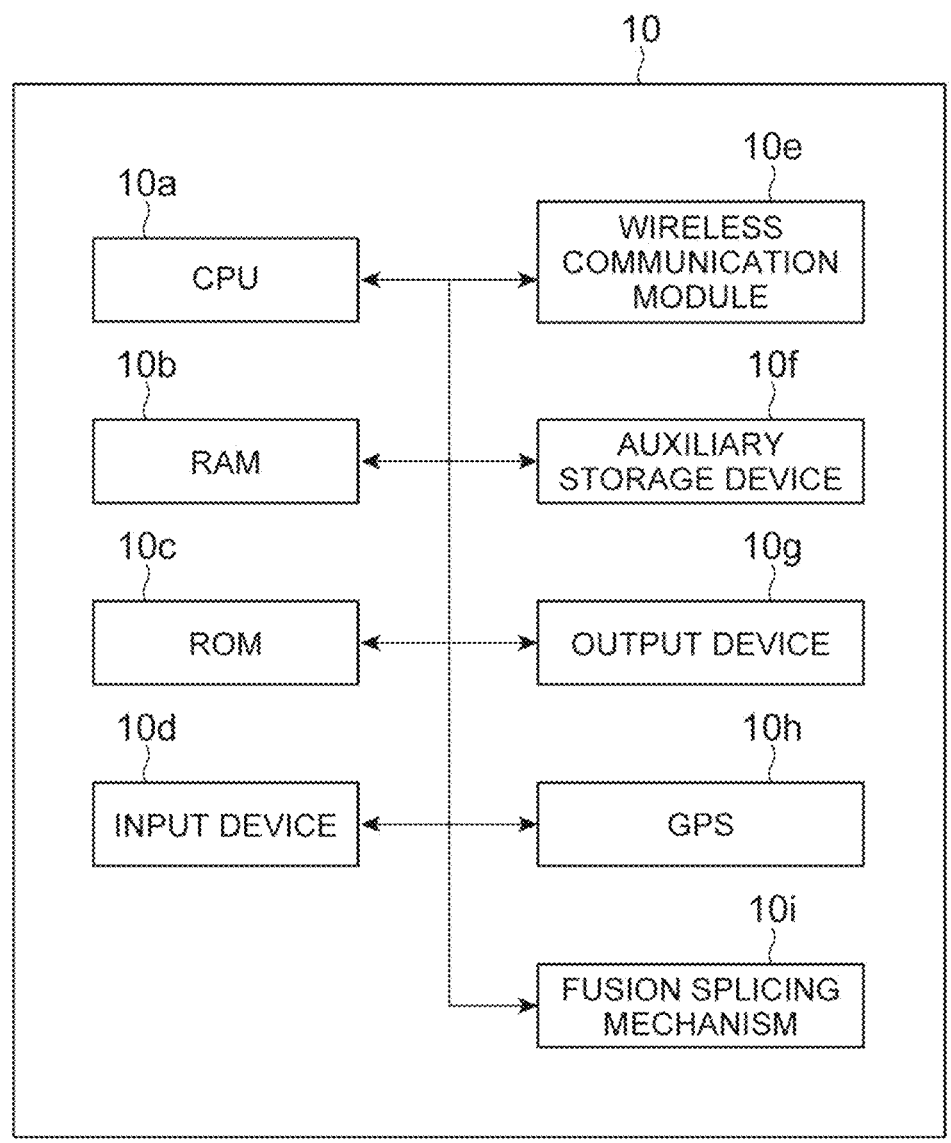
FIG. 4 is a block diagram illustrating a hardware configuration of the fusion splicer shown in FIG. 3.

The fusion splicer 10 is functionally provided with a control unit 11 that controls whole fusion splicer, a communication unit 12 for carrying out wireless communication with an outside device and an update unit 13 for updating an operation program for performing operation control of the device by the control unit 11. In addition to the aforementioned various fusion splicing mechanisms 10i (discharge electrodes 3c or the like), the fusion splicer 10 is physically configured, as shown in FIG. 4, to include a computer provided with hardware such as a CPU 10a, a RAM 10b, a ROM 10c, an input device 10d for receiving input of user operation such as a touch panel (monitor 5), a wireless communication module 10e for wirelessly transmitting/receiving data, an auxiliary storage device 10f such as a semiconductor memory or hard disk, and an output device 10g such as a display (monitor 5). The fusion splicer 10 operates the hardware according to a program or the like introduced into the hardware such as the RAM 10b under the control of the CPU 10a, reads or writes data in the RAM 10b and the auxiliary storage device 10f or the like, and thereby implements various functions of the fusion splicer 10 which will be described later. The fusion splicer 10 may also be provided with a device for acquiring positional information such as a GPS 10h and may be configured to be able to acquire positional information of the fusion splicer 10 such as longitudes and latitudes through the GPS 10h.

The control unit 11 controls operations of the various fusion splicing mechanisms 10i of the fusion splicer 10 using predetermined operating software (also denoted as "operation program") stored in the auxiliary storage device 10f or the like. An environment in which the fusion splicer 10 is used varies finely depending on a region (high temperature region, low temperature region, high humidity region, low atmospheric pressure region, or at sea, or the like) and purpose for which each fusion splicer 10 is used (for indoor communication network, for outdoor communication network, for trunk line communication network, or for optical fiber connection in optical communication equipment, or the like), and therefore the fusion splicer 10 is controlled by operating software in accordance with the environment in which each fusion splicer 10 is used so that the operation is performed under optimum connection conditions and reinforcement conditions.

The communication unit 12 is a unit for performing wireless communication with the control device 20 (receiving unit 21 and the transmitting unit 24). The communication unit 12 is constructed of, for example, a wireless LAN card and performs wireless communication with the control device 20 in a 2.4 GHz band conforming to IEEE802.11. Although details are omitted in FIG. 3, each fusion splicer 10 is provided with the communication unit 12 and each communication unit 12 wirelessly transmits an SSID (identifier) of a wireless access point (wireless AP) unique to each fusion splicer 10. Examples of such an SSID include: SSID of wireless AP of the first fusion splicer 10 is "T71C_420000001," SSID of wireless AP of the second fusion splicer 10 is "T71C_420000002," SSID of wireless AP of the third fusion splicer 10 is "T71C_420000003," and SSID of wireless AP of the fourth fusion splicer 10 is "T71C_420000004" having mutually different identifiers. Wireless communication by the communication unit 12 is not limited to the aforementioned communication standard, and other communication standards may also be used.

When updating a version or the like of operating software for controlling operation of the fusion splicer 10 by the control unit 11, the update unit 13 updates the operating software. Upon acquiring the operating software update information received from the control device 20 via the communication unit 12 (details will be described later), the update unit 13 updates the current operating software to a new version based on the update information and causes the auxiliary storage device 10f or the like to store the upgraded operating software or the updated part. When the operating software has been appropriately upgraded, the update unit 13 transmits a wireless signal indicating the successful update to the control device 20 via the communication unit 12. Upon acquiring the information indicating that update processing has been appropriately performed from the update unit 13, the control device 20 performs synchronization processing of rewriting the identifier of the updated fusion splicer 10 and the state of the operating software (version information) with the new ones in the management database (first database 32) managed by the server 30.

Figure 5:
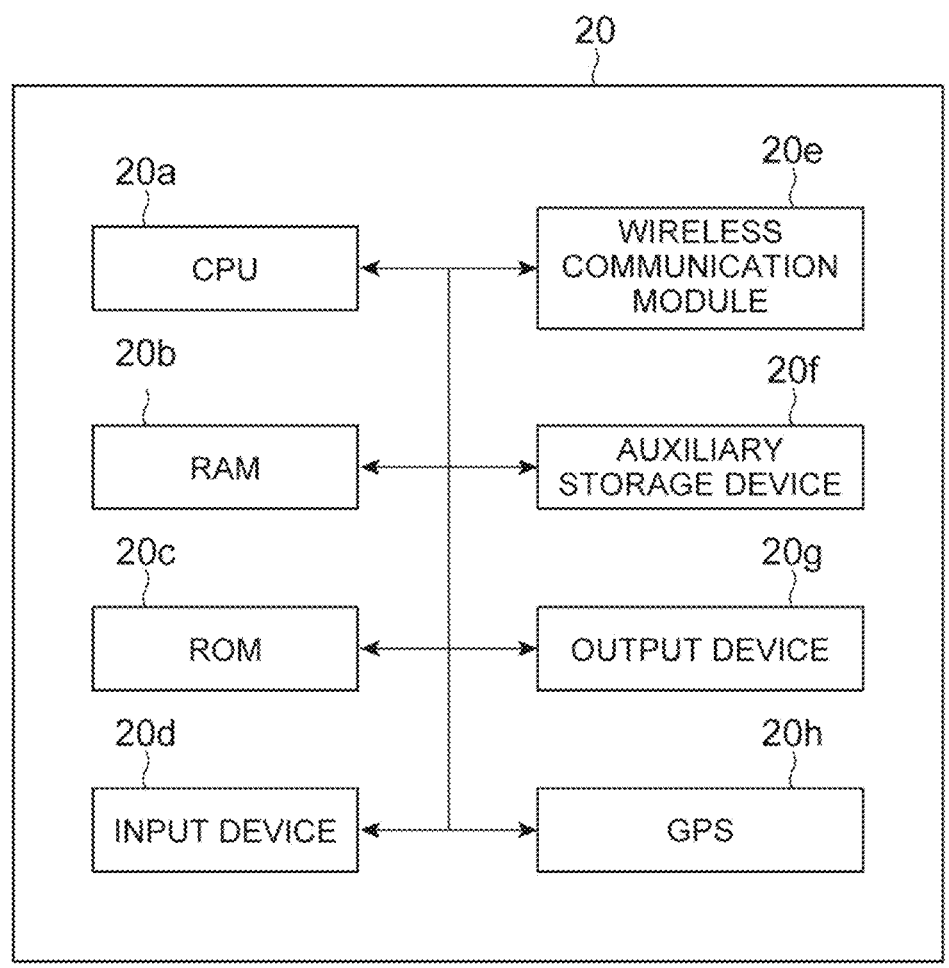
FIG. 5 is a block diagram illustrating a hardware configuration of the control device shown in FIG. 3.
Figure 6:
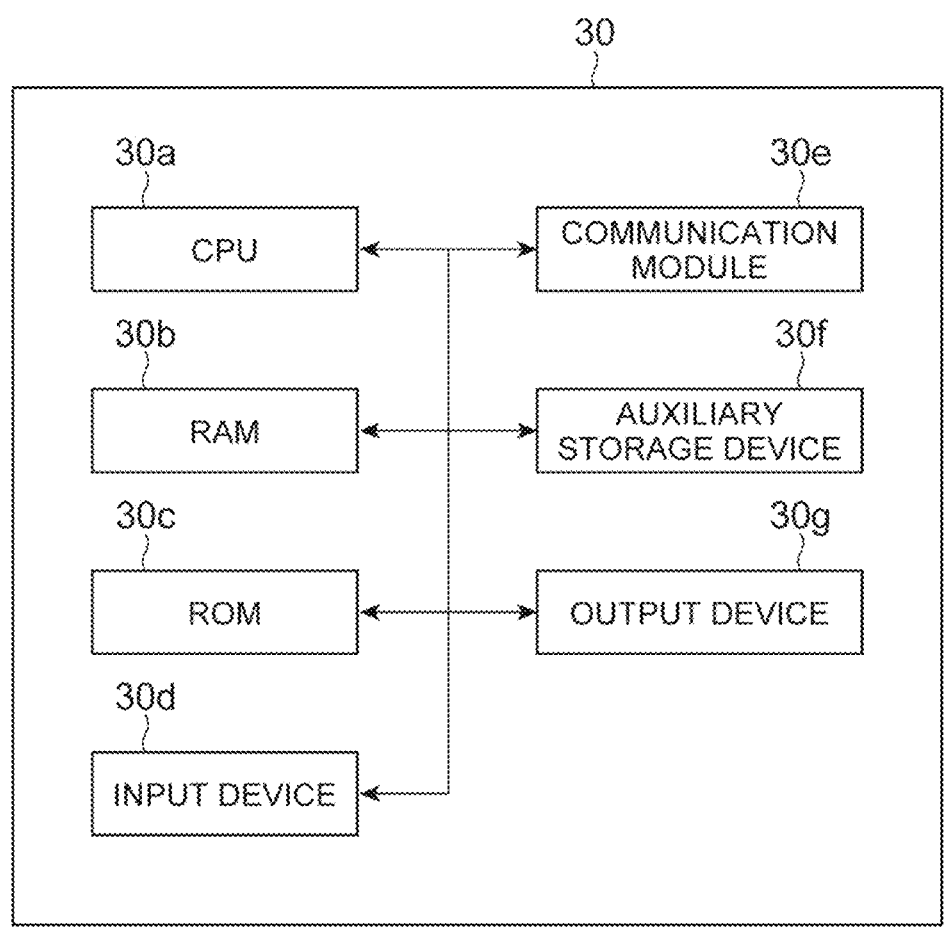
FIG. 6 is a block diagram illustrating a hardware configuration of the server shown in FIG. 3.

The control device 20 managing updating of the operating software of the fusion splicer 10 having such a configuration is constructed of an information terminal such as a portable wireless communication terminal such as a smartphone or a personal computer (PC) provided with a wireless communication function. The control device 20 is functionally provided with the receiving unit 21, a determination unit 22, an acquisition unit 23 and a transmitting unit 24. The control device 20 is physically configured to include a computer provided with, as shown in FIG. 5, a CPU 20a, a RAM 20b, a ROM 20c, an input device 20d for receiving input of user operation such as a touch panel, a wireless communication module 20e for wirelessly transmitting/receiving data, an auxiliary storage device 20f such as a semiconductor memory or hard disk, an output device 20g such as a display, and hardware such as a GPS 20h. The control device 20 causes the hardware to operate according to the program or the like introduced onto the hardware such as the RAM 20b under the control of the CPU 20a, reads/writes data from/to the RAM 20b and the auxiliary storage device 20f or the like, and thereby implements the respective functions of the control device 20, which will be described later. Furthermore, as shown in FIG. 6, the server 30 likewise has a hardware configuration including a CPU 30a, a RAM 30b, a ROM 30c, an input device 30d, a communication module 30e, an auxiliary storage device 30f and an output device 30g, and the respective functions are implemented when the respective components operate according to a program or the like.

The receiving unit 21 is constructed of a wireless communication module 20e together with the transmitting unit 24, which will be described later, and receives various wireless signals through wireless communication with the communication unit 12 of the fusion splicer 10. The receiving unit 21 is constructed by including, for example, a wireless LAN module or the like incorporated in a terminal and carries out communication in a 2.4 GHz band conforming to, for example, IEEE802.11 in such a way as to correspond to a wireless standard of the communication unit 12. The receiving unit 21 receives an SSID (identifier) individually assigned to each fusion splicer 10 from the aforementioned plurality of fusion splicers 10 through a wireless signal. Furthermore, the receiving unit 21 acquires individual information including version information of the operating software of the fusion splicer 10 determined to be updated and body information from the fusion splicer 10 through the wireless signal. Here, the "body information" means, for example, a number unique for every fusion splicer 10 body or a unique number indicating every region or feature of the shipment destination.

The determination unit 22 determines whether or not operating software of each fusion splicer 10 to which the SSID (identifier) received by the receiving unit 21 is assigned is operating software to be updated. When the receiving unit 21 receives the SSID from the plurality of fusion splicers 10, the determination unit 22 accesses a first database 32 of the server 30 via a predetermined communication network, acquires a list of target devices for which operating software needs to be updated and determines whether or not the list of target devices includes the received SSID, that is, whether or not there are fusion splicers 10 for which operating software needs to be updated. The first database 32 of the server 30 is a database in which SSIDs of many fusion splicers 10 are associated with their current version information and information indicating whether or not their versions need to be upgraded. Upon determining that there are fusion splicers 10 for which operating software needs to be updated, the determination unit 22 delivers the information to the acquisition unit 23.

The acquisition unit 23 acquires update information of operating software corresponding to the fusion splicer 10 for which the determination unit 22 determines that operating software is to be updated. Upon acquiring the information that there are fusion splicers 10 for which operating software needs to be updated from the determination unit 22, the acquisition unit 23 transmits individual information including version information of the operating software and body information of the fusion splicers 10 acquired by the receiving unit 21 to the server 30, collates the individual information with the second database 33 of the server 30 and acquires operating software update information (the address acquired) appropriate for the fusion splicer 10. Note that the second database 33 is information in which respective identifiers of the fusion splicers 10 are associated with at least one of current version information of the operating software and body information of the fusion splicers 10.

Upon acquiring the acquisition address as operating software update information first, the acquisition unit 23 accesses a third database 34 of the server 30 based on the acquisition address and acquires various update files (software files and various kinds of body setting information) stored in the third database 34. As described above, an environment in which each fusion splicer 10 is used varies finely depending on a region in which the fusion splicer 10 is used (high temperature region, low temperature region, high humidity region, low atmospheric pressure region, or at sea, or the like) and a purpose for which the fusion splicer 10 is used (for indoor communication network, for outdoor communication network, for trunk line communication network, or for optical fiber connection in optical communication equipment, or the like), and therefore the operating software and the update information thereof are unique to each fusion splicer 10. Therefore, the update information of the fusion splicer 10 may include information individually set according to at least one condition of region-related information including time, temperature, humidity, atmospheric pressure or position (e.g., longitude, latitude, name of country, IP address or the like) of a region in which the fusion splicer 10 is used and a purpose for which the fusion splicer is used.

The transmitting unit 24 transmits operating software update information appropriate for the individual fusion splicer 10 acquired by the acquisition unit 23 to the fusion splicer 10. When the transmitting unit 24 transmits such update information to the fusion splicer 10 whose wireless connection is established, the fusion splicer 10 receives the update information through the communication unit 12 and performs update processing of the aforementioned operating software through the update unit 13. As described above, the transmitting unit 24 is constructed by including, for example, a wireless LAN module or the like incorporated in the terminal together with the receiving unit 21.

When the determination unit 22 determines that operating software of at least two or more fusion splicers 10 is operating software to be updated, the control device 20 in such a configuration performs processing of acquisition of update information by the acquisition unit 23 and transmission of update information by the transmitting unit 24 sequentially and repeatedly for each fusion splicer 10, that is, updates the fusion splicers 10 in order while changing SSIDs of the fusion splicers 10 to be connected.

The server 30 is constructed of a collation unit 31 and a plurality of databases (first, second and third databases 32 to 34). The server 30 is connected to the control device 20 via a predetermined communication channel and configured to be able to mutually transmit/receive information. Upon receiving individual information including version information and body information of the fusion splicer 10 to be updated from the control device 20, the collation unit 31 of the server 30 collates the fusion splicer 10 using the second database 33 and notifies, when the fusion splicer 10 is normal, the acquisition unit 23 of the control device 20 of the acquisition address of a set of update files (software and various kinds of body setting information) customized for the fusion splicer 10. FIG. 7 is a diagram illustrating an example of the second database 33 for collation, and in this database, each SSID is associated with latest version information of operating software and information on updatability of firmware (FW updatability) or the like. Furthermore, FIG. 8 and FIG. 9 illustrate an example of an auxiliary database of a detailed device specification corresponding to the "device setting number" and "connectable regional group number" in the database shown in FIG. 7. Note that the server 30 is often installed in a remote place with respect to the control device 20, but may also be installed in proximity to the control device 20.

Figure 10:
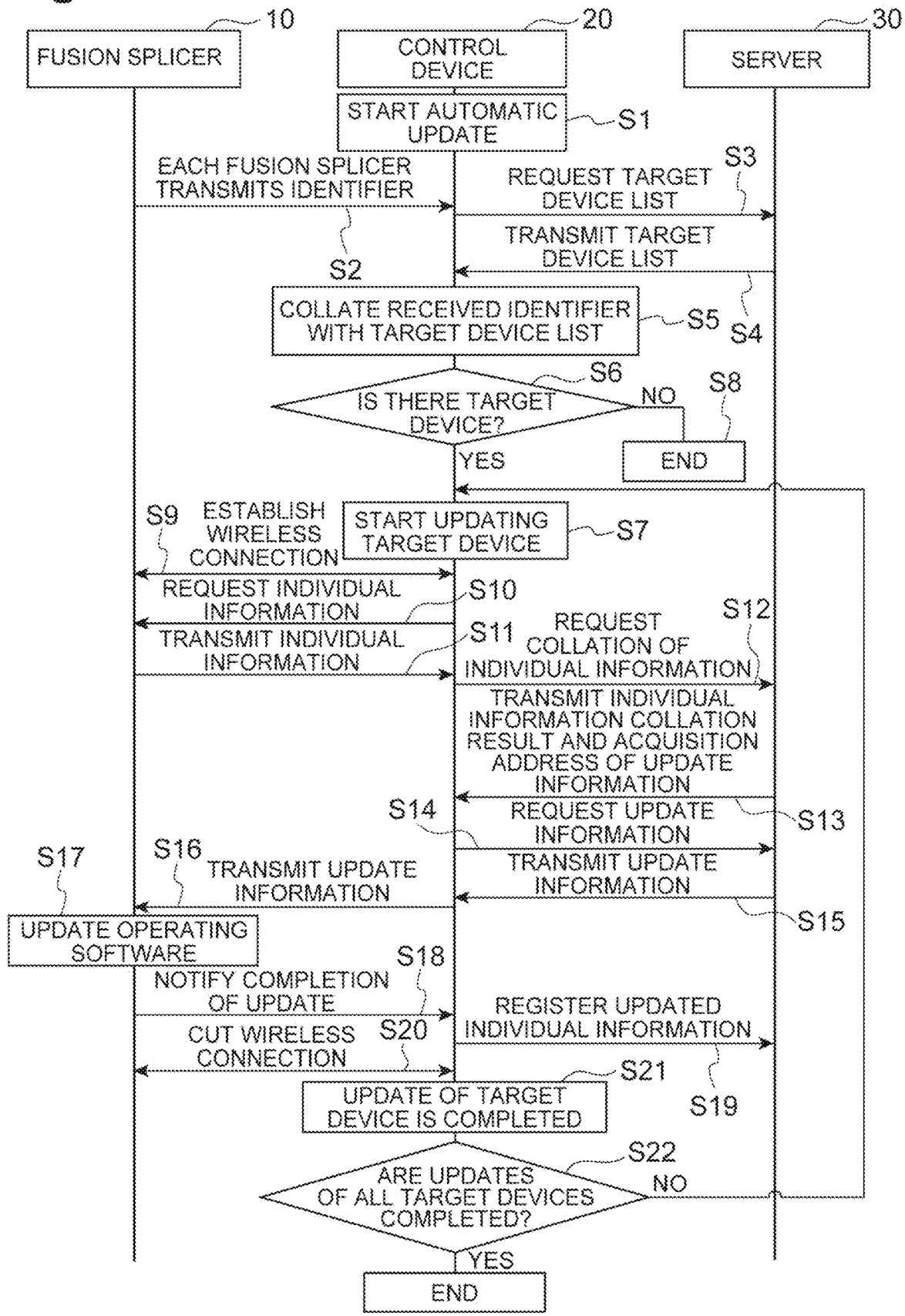
FIG. 10 is a sequence diagram illustrating update processing of operating software by the management system shown in FIG. 3.

Next, update processing on the operation program by the management system 1 of the fusion splicer according to the present embodiment will be described with reference to FIG. 10. FIG. 10 is a sequence diagram illustrating update processing of operating software by the plurality of fusion splicers 10.

As shown in FIG. 10, the management system 1 starts update processing of the operating software of the plurality of fusion splicers 10 by the control device 20 (step S1). The update processing is started by the control device 20 (input device 20d) receiving a predetermined input operation performed by the user. When automatic update processing of software starts in step S1, wireless communication by the plurality of fusion splicers 10 is also started, an SSID (identifier) of an individual wireless access point (wireless AP) is wirelessly transmitted from each fusion splicer 10 and received by the receiving unit 21 (wireless LAN adapter function) of the control device 20 (step S2). Examples of such an SSID include: SSID of wireless AP of the first fusion splicer 10 is "T71C_420000001," SSID of wireless AP of the second fusion splicer 10 is "T71C_420000002," SSID of wireless AP of the X-th fusion splicer 10 is "T71C_42XXXXXXX," the respective fusion splicers 10 having mutually different SSIDs (identifiers).

Next, when the automatic update processing in step S1 starts, the control device 20 requests a target device list of the fusion splicers 10, operating software of which is to be updated, of the server 30 (step S3) and acquires the target device list transmitted from the server 30 (step S4). In the case of the request made in step S3, the control device 20 sends information on the control device 20 (e.g., individual identification number, positional information, IP address of the control device 20) to the server 30 (first database 32) and acquires a predetermined target device list based on the user's contract contents or operating environment or the like. This target device list corresponds to the group of the fusion splicers 10 based on the contract contents and operating environment or the like of each control device 20, and is a list that associates the aforementioned identifier for identifying the fusion splicer 10 included in the group with information on the version of the current operating software of each fusion splicer 10.

Next, the control device 20 collates the SSID (identifier) of each fusion splicer acquired in step S2 with the list of devices, operating software acquired in step S4 of which is to be updated (step S5), and the determination unit 22 determines whether or not any SSID corresponding to the SSID acquired in step S2 is found in the device list, that is, whether or not there is any fusion splicer 10, operating software of which is to be updated (step S6). When it is determined in step S6 that there are some devices, operating software of which is to be updated, the control device 20 moves on to step S7, starts update processing on the target device, and, on the other hand, when there is no device, operating software of which is to be updated, the control device 20 moves on to step S8 and ends the processing.

Next, upon moving on to step S7, the control device 20 establishes a wireless connection between the first fusion splicer 10 and the control device 20 to start update processing on the operating software of the first fusion splicer 10, operating software of which is to be updated (step S9). Once the wireless connection is established, the control device 20 wirelessly transmits a request signal to request the first fusion splicer 10 to send individual information such as body information of the fusion splicer and version information of the current operating software back to the control device 20 using this wireless connection (step S10). Upon receiving the request signal, the first fusion splicer 10 sends the individual information such as body information of the fusion splicer and the version information of the current operating software back to the control device 20 (step S11).

Next, upon acquiring the individual information such as body information and the version information of the current operating software of the fusion splicer from the first fusion splicer 10, the control device 20 sends the acquired individual information to the server 30, reads the second database 33 (e.g., see FIG. 7 to FIG. 9) and requests collation of the individual information (step S12). When the server 30 (second database 33) determines through the collation that the individual information of the first fusion splicer 10 is normal, the server 30 notifies the control device 20 of the collation result of the individual information and the acquisition address of the update file set (software file and various kinds of body setting information or the like) customized for the first fusion splicer 10 (step S13).

Next, upon acquiring the acquisition address of the update file set from the server 30, the control device 20 requests the server 30 to download the update file set (update information) and acquires the file set from the server 30 (steps S14 and 15). The control device 20 that has acquired the update file set wirelessly transmits the acquired file set to the first fusion splicer 10 (step S16).

Next, the first fusion splicer 10 that has acquired the update file set updates the own operating software through the update unit 13 and stores the update file in a predetermined memory (step S17). When the update processing on the operating software has been appropriately completed, the fusion splicer 10 notifies the control device 20 of completion of update through a wireless signal (step S18). Upon receiving the notice of completion of update, the control device 20 transmits the individual information such as information on the completion of update of the first fusion splicer 10 to the server 30 (first database 32) (step S19), and the server 30 performs synchronization processing of rewriting the update state of the operating software of the first fusion splicer 10 with a new state in the first database 32.

After that, the control device 20 cuts the wireless connection established with the first fusion splicer 10 (step S20), and completes the update processing on the operating software of the first fusion splicer 10 (step S21).

Next, when the update processing on the operating software of the first fusion splicer 10 is completed, the control device 20 moves on to step S22, determines whether or not updates of all the target devices determined in step S6 have been completed and the control device 20 ends the processing when updates of all the target devices have been completed. On the other hand, when the determination result in step S22 shows that updates of all the target fusion splicers 10 have not been completed, the control device 20 returns to step S7, repeats the processes in steps S7 to S21 and completes updates of the operating software of all the target devices.

As described above, according to the management system 1 and the management method using the system for the fusion splicers 10 according to the present embodiment, when operating software is updated, it is determined whether or not the operating software of each fusion splicer 10 is operating software to be updated based on SSIDs (identifiers) uniquely assigned to the plurality of fusion splicers 10. Update information of operating software corresponding to the fusion splicer 10, operating software of which is determined to be updated is acquired and the update information is transmitted to the fusion splicer 10 through a wireless signal. Therefore, the many fusion splicers 10 need not be manually connected via cables respectively and update information appropriate for an environment in which the fusion splicers 10 are used is automatically selected, and so it is possible to easily update operating software.

According to the management system 1 and the management method using the system, the receiving unit 21 acquires individual information including version information of the operating software and the body information of the fusion splicer 10 determined to be updated from the fusion splicer 10 via a wireless signal, the acquisition unit 23 collates the individual information acquired by the receiving unit 21 with the second database 33 and thereby acquires operating software update information corresponding to the fusion splicer 10. Update information appropriate for the individual information including the version information of the operating software and the body information is acquired in this way, and it is thereby possible to update operating software using update information more suitable for each of the fusion splicers 10.

According to the management system 1 and the management method using the system, the second database 33 includes information in which the respective identifiers of the fusion splicers 10 are associated with current version information of operating software and body information of the respective fusion splicers 10. Thus, it is possible to select suitable update information based on the information associated with the identifiers and thereby update operating software using update information more suitable for the fusion splicers 10 respectively.

According to the management system 1 and the management method using the system, when the determination unit 22 determines that operating software of at least two or more fusion splicers 10 is operating software to be updated, processes of acquisition of update information by the acquisition unit 23 and transmission of update information by the transmitting unit 24 are sequentially repeated for each fusion splicer 10. It is thereby possible to update operating software sequentially for all of the plurality of fusion splicers 10 within a wirelessly communicable range using update information suitable for the fusion splicers 10 respectively.

According to the management system 1 and the management method using the system, the operating software update information appropriate for the fusion splicers 10 includes information individually set according to at least one condition of region-related information including at least one of time, temperature, humidity, atmospheric pressure and position of a region in which the fusion splicer 10 is used and a purpose for which the fusion splicer 10 is used. For this reason, it is possible to update operating software using update information more suitable for the environment in which the fusion splicer 10 is used. As positional information of the fusion splicer 10, positional information (e.g., acquired by the GPS 10h) of the fusion splicer 10 itself may be used or positional information (e.g., acquired by the GPS 20h) of the control device 20 provided nearby which is inferior in accuracy but is advantageous in that an existing device may be used.

According to the management system 1 and the management method using the system, the receiving unit 21 has a function as a wireless LAN adapter wirelessly communicable with the plurality of fusion splicers 10 having functions as wireless access points through a wireless LAN. Thus, since the fusion splicers 10 are used as the wireless access points, it is possible to easily exert the aforementioned operations and effects and implement a simple system without the need for constructing a new network environment.

Although the management system and the management method for performing update processing on a fusion splicer according to the present embodiment have been described so far, the management system and the management method according to the present invention are not limited to the above-described embodiment, but various modifications can be applied.

REFERENCE SIGNS LIST

1 . . . management system, 10 . . . fusion splicer, 11 . . . control unit, 12 . . . communication unit, 13 . . . update unit, 20 . . . control device, 21 . . . receiving unit, 22 . . . determination unit, 23 . . . acquisition unit, 24 . . . transmitting unit, 30 . . . server, 31 . . . collation unit, 32 . . . first database, 33 . . . second database, 34 . . . third database

The invention claimed is:

1. A management system for managing updating of operating software of a plurality of fusion splicers to which unique identifiers are assigned respectively, the management system comprising:
a receiving unit that receives identifiers from the respective fusion splicers through wireless signals, the identifiers being assigned to the respective fusion splicers;
a determination unit that determines whether or not operating software of each fusion splicer assigned to each identifier received by the receiving unit is operating software to be updated;
an acquisition unit that acquires operating software update information appropriate for a fusion splicer for which the operating software is determined by the determination unit to be operating software to be updated; and
a transmitting unit that transmits operating software update information appropriate for the particular fusion splicer acquired by the acquisition unit to the particular fusion splicer,
wherein the receiving unit acquires individual information of at least one of version information of operating software of the fusion splicer and body information of the fusion splicer from the fusion splicer using a wireless signal, the fusion splicer being determined to be a target for update, and wherein the acquisition unit collates the individual information acquired by the receiving unit with a predetermined database and acquires operating software update information appropriate for the fusion splicer.

2. The management system for fusion splicers according to claim 1, wherein the predetermined database is information in which the respective identifiers of the fusion splicers are associated with at least one of current version information of operating software of the respective fusion splicers and body information of the respective fusion splicers.

3. The management system for fusion splicers according to claim 1, wherein when the determination unit determines that operating software of at least two fusion splicers is operating software to be updated, respective processes of acquisition of update information by the acquisition unit and transmission of the update information by the transmitting unit are sequentially repeated for each fusion splicer.

4. The management system for fusion splicers according to claim 1, wherein the update information of operating software appropriate for the fusion splicer includes information individually set according to at least one condition of region-related information and a purpose for which the fusion splicer is used, the region-related information including at least one of time, temperature, humidity, atmospheric pressure and position of a region in which the fusion splicer is used.

5. The management system for fusion splicers according to claim 1, wherein the receiving unit has a function as a wireless LAN adapter wirelessly communicable with the plurality of fusion splicers having functions as wireless access points using a wireless LAN.

6. A management system for managing updating of operating software of a plurality of fusion splicers to which unique identifiers are assigned respectively, the management system comprising:

a receiving unit that receives identifiers from the respective fusion splicers through wireless signals, the identifiers being assigned to the respective fusion splicers;

a determination unit that determines whether or not operating software of each fusion splicer assigned to each identifier received by the receiving unit is operating software to be updated;

an acquisition unit that acquires operating software update information appropriate for a fusion splicer for which the operating software is determined by the determination unit to be operating software to be updated; and a transmitting unit that transmits operating software update information appropriate for the particular fusion splicer acquired by the acquisition unit to the particular fusion splicer, wherein when the determination unit determines that operating software of at least two fusion splicers is operating software to be updated, respective processes of acquisition of update information by the acquisition unit and transmission of the update information by the transmitting unit are sequentially repeated for each fusion splicer.

7. The management system for fusion splicers according to claim 6, wherein the update information of operating software appropriate for the fusion splicer includes information individually set according to at least one condition of region-related information and a purpose for which the fusion splicer is used, the region-related information including at least one of time, temperature, humidity, atmospheric pressure and position of a region in which the fusion splicer is used.

8. The management system for fusion splicers according to claim 6, wherein the receiving unit has a function as a wireless LAN adapter wirelessly communicable with the plurality of fusion splicers having functions as wireless access points using a wireless LAN.

9. A management system for managing updating of operating software of a plurality of fusion splicers to which unique identifiers are assigned respectively, the management system comprising:

a receiving unit that receives identifiers from the respective fusion splicers through wireless signals, the identifiers being assigned to the respective fusion splicers;

a determination unit that determines whether or not operating software of each fusion splicer assigned to each identifier received by the receiving unit is operating software to be updated;

an acquisition unit that acquires operating software update information appropriate for a fusion splicer for which the operating software is determined by the determination unit to be operating software to be updated; and a transmitting unit that transmits operating software update information appropriate for the particular fusion splicer acquired by the acquisition unit to the particular fusion splicer, wherein the update information of operating software appropriate for the fusion splicer includes information individually set according to at least one condition of region-related information and a purpose for which the fusion splicer is used, the region-related information including at least one of time, temperature, humidity, atmospheric pressure and position of a region in which the fusion splicer is used.

10. The management system for fusion splicers according to claim 9, wherein the receiving unit has a function as a wireless LAN adapter wirelessly communicable with the plurality of fusion splicers having functions as wireless access points using a wireless LAN.

11. A management system for managing updating of operating software of a plurality of fusion splicers to which unique identifiers are assigned respectively, the management system comprising:

a receiving unit that receives identifiers from the respective fusion splicers through wireless signals, the identifiers being assigned to the respective fusion splicers;

a determination unit that determines whether or not operating software of each fusion splicer assigned to each identifier received by the receiving unit is operating software to be updated;

an acquisition unit that acquires operating software update information appropriate for a fusion splicer for which the operating software is determined by the determination unit to be operating software to be updated; and a transmitting unit that transmits operating software update information appropriate for the particular fusion splicer acquired by the acquisition unit to the particular fusion splicer, wherein the receiving unit has a function as a wireless LAN adapter wirelessly communicable with the plurality of fusion splicers having functions as wireless access points using a wireless LAN.

12. A method for managing update of operating software of a plurality of fusion splicers to which unique identifiers are assigned respectively, with a management system, the method comprising:

receiving by a receiving unit of the management system, identifiers from the plurality of fusion splicers through wireless signals respectively, the identifiers being assigned to the fusion splicers respectively;

determining by a determination unit of the management system, whether or not operating software of the respective fusion splicers assigned to the identifiers received in the receiving is operating software to be updated;

acquiring by the receiving unit of the management system, individual information of at least one of version information of operating software of the fusion splicer and body information of the fusion splicer from the fusion splicer using a wireless signal, the fusion splicer being determined to be a target for update;

acquiring by an acquisition unit of the management system, operating software update information appropriate for the fusion splicer by collating the individual information acquired by the receiving unit with a predetermined database; and transmitting by a transmitting unit of the management system, operating software update information appropriate for the particular fusion splicer acquired in the acquiring to the particular fusion splicer.

13. The method according to claim 12, wherein the predetermined database is information in which the respective identifiers of the fusion splicers are associated with at least one of current version information of operating software of the respective fusion splicers and body information of the respective fusion splicers.

14. A method for managing update of operating software of a plurality of fusion splicers to which unique identifiers are assigned respectively, with a management system, the method comprising:

receiving by a receiving unit of the management system, identifiers from the plurality of fusion splicers through wireless signals respectively, the identifiers being assigned to the fusion splicers respectively;

determining by a determination unit of the management system, whether or not operating software of the respective fusion splicers assigned to the identifiers received in the receiving is operating software to be updated;

acquiring by an acquisition unit of the management system, operating software update information appropriate for a fusion splicer for which the operating software is determined in the determining to be operating software to be updated; and transmitting by a transmitting unit of the management system, operating software update information appropriate for the particular fusion splicer acquired in the acquiring to the particular fusion splicer, wherein when the determination unit determines that operating software of at least two fusion splicers is operating software to be updated, respective processes of acquiring of update information by the acquisition unit and transmitting of the update information by the transmitting unit are sequentially repeated for each fusion splicer.

15. A method for managing update of operating software of a plurality of fusion splicers to which unique identifiers are assigned respectively, with a management system, the method comprising:

receiving by a receiving unit of the management system, identifiers from the plurality of fusion splicers through wireless signals respectively, the identifiers being assigned to the fusion splicers respectively;

determining by a determination unit of the management system, whether or not operating software of the respective fusion splicers assigned to the identifiers received in the receiving is operating software to be updated;

acquiring by an acquisition unit of the management system, operating software update information appropriate for a fusion splicer for which the operating software is determined in the determining to be operating software to be updated; and transmitting by a transmitting unit of the management system, operating software update information appropriate for the particular fusion splicer acquired in the acquiring to the particular fusion splicer, wherein the update information of operating software appropriate for the fusion splicer includes information individually set according to at least one condition of region-related information and a purpose for which the fusion splicer is used, the region-related information including at least one of time, temperature, humidity, atmospheric pressure and position of a region in which the fusion splicer is used.

16. A method for managing update of operating software of a plurality of fusion splicers to which unique identifiers are assigned respectively, with a management system, the method comprising:

receiving by a receiving unit of the management system, identifiers from the plurality of fusion splicers through wireless signals respectively, the identifiers being assigned to the fusion splicers respectively;

determining by a determination unit of the management system, whether or not operating software of the respective fusion splicers assigned to the identifiers received in the receiving is operating software to be updated;

acquiring by an acquisition unit of the management system, operating software update information appropriate for a fusion splicer for which the operating software is determined in the determining to be operating software to be updated; and transmitting by a transmitting unit of the management system, operating software update information appropriate for the particular fusion splicer acquired in the acquiring to the particular fusion splicer, wherein the receiving unit has a function as a wireless LAN adapter wirelessly communicable with the plurality of fusion splicers having functions as wireless access points using a wireless LAN.

* * * * *